Nov. 7, 1939.                D. W. GUSTAVESON                2,179,291
                         RACK FOR COOKING UTENSILS
                          Filed March 10, 1939           2 Sheets-Sheet 1

Inventor:
David W. Gustaveson,
by Harry E. Dunham
His Attorney.

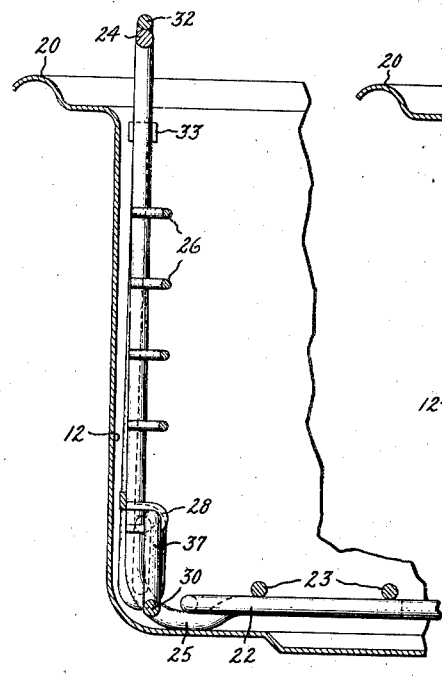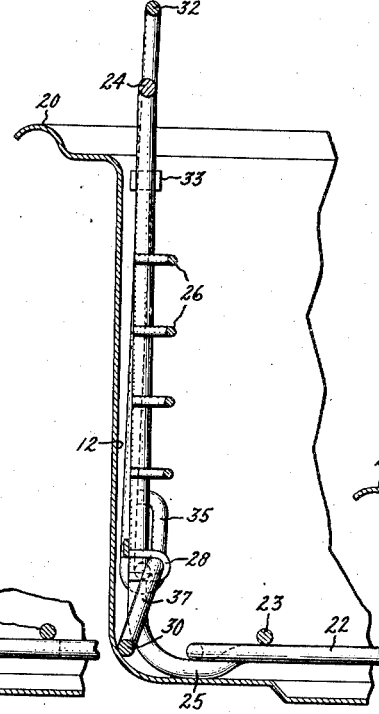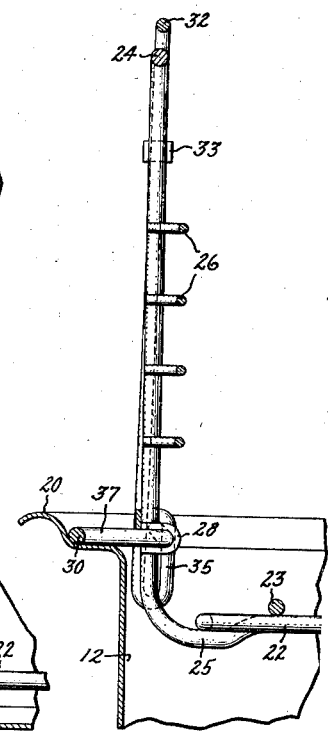

Patented Nov. 7, 1939

2,179,291

UNITED STATES PATENT OFFICE 2,179,291

RACK FOR COOKING UTENSILS

David W. Gustaveson, Bridgeport, Conn., assignor to General Electric Company, a corporation of New York Application March 10, 1939, Serial No. 261,008

12 Claims. (Cl. 53—1)

My invention relates to racks and more particularly removable racks to be used with cooking devices, such as electric roasters, and has for its object the provision of a rack which is convenient to use, which has a rugged and simple construction, and which can be manufactured at low cost.

In cooking utensils, and particularly electric roasters, it is desirable to have a rack which can be inserted within the food receiving portion of a cooking receptacle upon which may be placed either the food to be cooked or the utensils containing the food to be prepared. It is desirable to have a rack which is removable from the food receiving receptacle and which is also provided with some means for supporting the rack on the top edge of the receptacle so that it may be conveniently loaded and unloaded.

In one of its aspects, my invention contemplates the provision of a rack adapted to be inserted within the food receiving receptacle of the electric roaster and provided with movable means for supporting the rack on the upper edge of the food receiving receptacle.

In another aspect my invention contemplates the provision on a rack for cooking utensils of auxiliary means for supporting the rack in an elevated position on the utensil which means are movable to a non-supporting or inoperative position so as not to impede the insertion of the rack in the food receiving well of the utensil and may be readily manipulated by the housewife or operator.

In still another aspect my invention contemplates the provision of auxiliary supports on a rack having stationary handles which supports are adapted to be moved by means of operating members superposed on and relatively movable with respect to the stationary handles.

More specific aspects and advantages of my invention will become apparent as the following description proceeds and the features of novelty which characterize my invention will be pointed out with particularity in the claims annexed to and forming a part of this specification.

Figure 1:
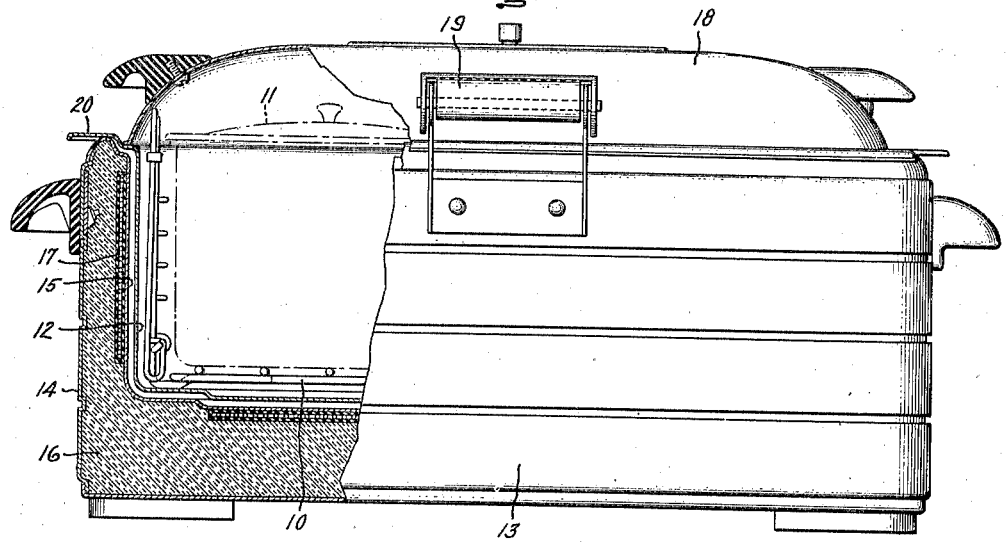
Figure 2:
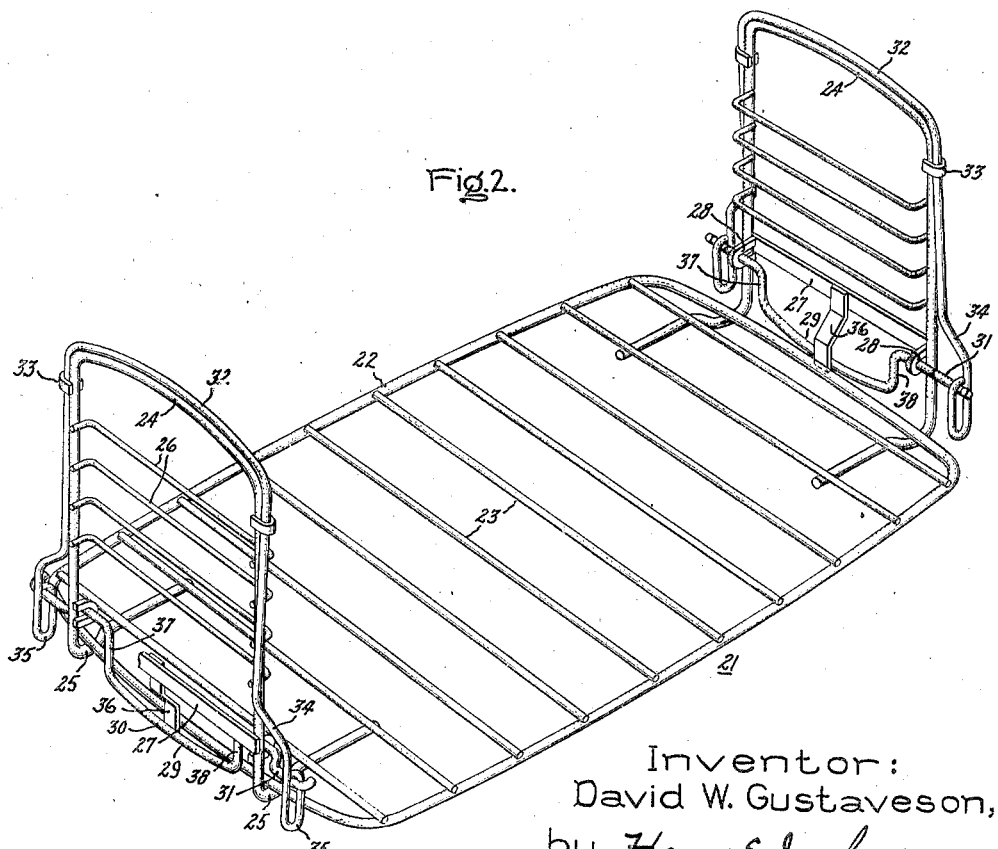

For a more complete understanding of my invention, reference is made to the following description taken in conjunction with the accompanying drawings in which Fig. 1 shows an electric cooking utensil, such as a roaster, having my improved rack inserted therein; Fig. 2 is a perspective of my improved rack construction; Fig. 3 is a partial section showing the position of the auxiliary support when the rack is inserted in a food receiving receptacle; Fig. 4 shows the position of the operating portions of the auxiliary support when the rack is being lifted out of the food receiving receptacle; and Fig. 5 shows the operative position of the auxiliary support, the offset portion thereof supporting the rack in its elevated position.

Referring to Fig. 1, I have shown my invention in one form as applied to an electric roaster. It is to be understood that while an electric roaster is described in detail in connection with my invention, the invention is of more general application and racks built in accordance therewith may be applied to various types of cooking utensils. In Fig. 1 it will be observed that a rack 10 upon which are mounted suitable cooking utensils 11 is inserted in the food receiving receptacle 12 of an electric roaster 13. While the details of the electric roaster form no part of my invention it will be observed that the roaster comprises an outer wall 14 and an inner wall 15 having arranged therebetween suitable insulating material 16 such as rock wool. These walls define a roaster well in which is positioned the removable food receiving receptacle 12. Embedded in the rock wool and mounted adjacent the inner wall 15 are suitable heating units 17. A cover 18 is provided for the roaster unit and is removably attached thereto by an improved hinge structure 19 which is specifically described and claimed in my co-pending application, Serial No. 261,009, filed March 10, 1939. The cover 18 is adapted to rest upon a marginal flange 20 provided on the upper edge of the removable food receiving receptacle 12.

The rack 10 comprises a substantially rectangular base portion 21 consisting of a rectangular frame 22 upon which is welded a plurality of transversely extending parallel wires 23. Welded to a pair of the transversely extending wires adjacent each end of the base member 21 is a substantially U-shaped stationary handle 24. Each leg of the U-shaped handle is provided with an offset portion 25 which is adapted to constitute a support for the rack when it is inserted in a food receiving receptacle. Vertically spaced on the upright portion of the U-shaped handle 24 is a plurality of transversely extending members 26. These members 26 are adapted to support additional racks or trays (not shown) upon which food may be placed. While the rack as described thus far is made up as a welded structure, it is to be understood that any other suitable method of fabrication might be used.

Mounted adjacent the lower end of the upright portion of the stationary handles 24 is a transversely extending bar 27 and welded on the inside edge of each end of this bar is a loop member 28. These loops 28 are arranged adjacent each of the upright leg members of the stationary handles and are adapted to support or carry the auxiliary support comprising the rotatable member 29. While the loops 28 are mounted on the auxiliary bar 27, it is to be understood that they may be welded to the stationary handles. The member 29 extends transversely of said stationary handles and is provided with an offset central portion 30 and on each of its ends is a crank portion 31. The member 29 is mounted in the loops 28 so that the offset portion 30 normally lies in a substantially vertical plane and is adapted to return to this position by its own weight. As has been previously pointed out, this construction permits the insertion of the rack in the food receiving receptacle 12 without the auxiliary support obstructing its free passage.

Superposed on each stationary handle 24 and extending substantially parallel thereto is a substantially U-shaped handle 32 which is movable relative to the stationary handle. Suitable clips 33 are provided adjacent the upper end of each of the stationary handles for guiding and maintaining the superposed relationship between the stationary and movable handles. Each of the legs of the handle 32 is provided with an offset portion 34 which in turn is provided with a loop 35 which is vertically elongated and extends substantially perpendicular to the plane of the handles. These loops are adapted to engage the cranks 31 provided on the ends of the members 29 so that movement of the latch handle vertically upward with respect to the stationary handle will cause a clockwise rotation of the latch member 29 thereby moving it outwardly. As previously stated, the loops 35 are vertically elongated. This elongation permits a limited amount of free movement of the handle 32 relative to the stationary handle before the member 29 is rotated. This makes it possible to separate the handles at the top and thereby obtain a good grip on the handle 32 before the lifting force is applied.

Provided centrally of each of the transversely extending bars 27 is a member 36 which forms a stop limiting the rotation in one direction of the member 29 and its associated offset portion 30. The rotation of the member 29 in the opposite direction is limited by the engagement of the arms 37 and 38 of the offset portion 30 with the bar 27.

In assembling my improved rack, the stationary handles 24 are welded to the base portion 21 and the bar 27 is welded to these handles. The assembly, including the member 29 and the movable handle 32, is then placed in position and the clips 33 and 28 are welded in position on the stationary handles 24 and bar 27, respectively. While welding is used exclusively, it is to be understood that any other suitable means may be used for fabricating and securing the component parts of the rack.

In describing the operation of my improved removable rack member, reference will be had to Figs. 3, 4 and 5 which show three positions of the auxiliary support provided on one end of the rack assembly. A fragmentary showing of one end of the rack, as illustrated in these figures, is deemed sufficient to illustrate the principle of operation but it is to be understood that the opposite end operates in an identical manner. In Fig. 3, the rack is shown inserted within a food receiving receptacle which is provided at its upper end with a marginal flange 20. While the racks shown in Figs. 3, 4 and 5 are illustrated as supporting no materials, it will be understood that in actual operation suitable containers, such as shown in Fig. 1, will be supported thereby. When it is desired to remove the rack from the receptacle the latch handle 32 is grasped and moved upwardly. At the outset the movable handles 32 are adapted to move freely relative to the rest of the structure thus making it possible for the operator to obtain a more firm grip on the movable handles 32. Having obtained a firm grip the handles 32 are adapted to be moved vertically an additional amount relative to the stationary handles. During this movement of the handles 32 relative to the stationary handle 24 the loop 35 is elevated and actuates the crank 31 so as to cause the member 30 to be rotated clockwise. The member 30 on the opposite side of the rack will be rotated counterclockwise by its associated actuating mechanism. The rotation of the member 30 is limited, however, by the sides of the food receiving receptacle 12. Thus, further lifting force supplied to the handle 32 causes the entire rack to be moved out of the receptacle, the member 30 scraping along the sides thereof. When the rack is lifted so that the member 30 is adjacent the marginal flange 20, it springs outwardly and engages this flange and since further rotation of the member is limited by the bar 27, the member 30 on each end of the rack forms an auxiliary support for the rack in this elevated position.

To reinsert the rack within the food receiving receptacle, the lower or stationary handle 24 is grasped and the entire rack assembly is lifted until the member 30 is free of the marginal flange 20. When this point is reached, the member of its own weight rotates counterclockwise and assumes its normal vertical position shown in Fig. 3. The entire assembly may then be lowered into the receptacle without the member 30 obstructing its passage.

From the foregoing description it will be observed that a simple and rugged rack assembly has been provided for a cooking utensil, the leg assembly including auxiliary supporting means movable from an inactive retracted position to an active extended position wherein they engage an upper edge of the cooking utensil to hold the rack in an elevated position. It will also be observed that strong rugged members superposed on the stationary handles and relatively movable with respect thereto have been provided for moving the auxiliary supports, the rugged operating members also serving as auxiliary handles for the rack.

While I have shown a particular embodiment of my invention, it will be understood, of course, that I do not wish to be limited thereto since many modifications may be made and I therefore contemplate by the appended claims to cover any such modifications as fall within the true spirit and scope of my invention.

What I claim as new and desire to secure by Letters Patent of the United States, is:

1. A rack for a cooking utensil comprising a base portion, stationary handles mounted on said base portion, supports movably mounted on said base portion and constructed and arranged to move from retracted non-supporting positions to extended supporting positions wherein they engage the upper edge of said utensil to hold the base portion in an elevated position, stops engaging said supports to define said extended supporting positions, and operating members superposed on said stationary handles and movable relatively to said stationary handles and said base portion to move said supports from their retracted positions to their extended positions against said stops.

2. A rack for a cooking utensil comprising a base portion, stationary handles mounted on said base portion, supports on said base portion movably mounted to move from retracted non-supporting positions to extended supporting positions wherein they engage the upper edge of said utensil to hold the base portion in an elevated position, movable handles superposed on said stationary handles and arranged for limited relative movement with reference thereto, and means connecting said movable handles and said supports so that movement of said supports between their retracted and extended position is effected by the movement of said movable handles between their limits of movement with reference to said stationary handles.

3. In a rack for a cooking utensil having a marginal flange, a base portion, a pair of stationary handles for said base portion, an auxiliary support rotatably mounted on each of said stationary handles and having normally inoperative non-supporting positions providing for insertion of said rack into said utensil, a pair of movable handles superposed on said stationary handles, and means on said movable handles for rotating said supports to move them into their operative positions to engage said flange on said cooking utensil and support said rack in an elevated position.

4. In a rack, a pair of stationary handles, a pair of handles mounted adjacent said stationary handles and vertically movable with respect thereto, a support movably mounted on each of said stationary handles, each of said supports having a crank portion on each end thereof and means on said movable handles cooperating with said crank portions so that vertical movement of said handle causes the movement of said support, said last mentioned means comprising loops receiving the crank portions and arranged to provide for a predetermined free movement of said movable handle prior to the movement of said support.

5. In a wire rack assembly, a base member, a pair of stationary handles mounted at opposite points on said base member, a transversely extending movable member mounted on each of said stationary handles adjacent the lower end thereof, said movable member having an offset central portion adapted to support said rack when moved from a non-supporting to a supporting position, and means superposed on said stationary handles and relatively movable with respect thereto for actuating said movable members to move said offset portions of said members from their non-supporting to their supporting positions.

6. In a rack for a cooking utensil having a marginal flange, a pair of stationary handles and means associated with said stationary handles for supporting said rack in an elevated position on said marginal flange, said means comprising a transversely extending movable member mounted on each of said stationary handles adjacent the lower end thereof, said movable member having an offset central portion adapted to engage said marginal flange when said member is in its supporting position, a pair of movable handles superposed on said stationary handles, and means on said movable handles engaging said transversely extending member at its ends so as to move it to its supporting position.

7. In a rack, a pair of U-shaped stationary handles, a pair of U-shaped handles superposed on said stationary handles and adapted to move vertically relative thereto, a normally inoperative auxiliary support mounted adjacent the lower end of each of said stationary handles, cranks provided on each of said supports and means provided on said movable U-shaped handle engaging said cranks so that vertical movement of said movable handle rotates said support to its operative position.

8. In a rack, a pair of U-shaped stationary handles, a pair of U-shaped movable handles superposed on said stationary handles and adapted to move vertically with respect thereto, a supporting member movably mounted on each of said stationary handles adjacent the lower end thereof and adapted to lie in a normally inoperative position, crank portions provided on each end of each of said movable supporting members, and means on each leg of each of said movable handles adapted to engage said crank portions so that vertical movement of said movable handles relative to said stationary handles causes said support to be rotated to its operative position.

9. The combination as set forth in claim 6 in which said last mentioned means comprises loops that receive said crank portions which provide for a predetermined free movement of said movable handles prior to rotation of said supporting members.

10. In a rack, a pair of U-shaped stationary handles, a pair of U-shaped movable handles superposed on said stationary handles and adapted to move vertically with respect thereto, a supporting member movably mounted on each of said stationary handles and adapted to lie in a normally non-supporting position, said supporting member extending transversely of said stationary handles and mounted adjacent the lower end thereof, crank portions provided on each end of said movable supporting members, and means on each leg of each of said movable handles adapted to engage said crank portions whereby vertical movement of said movable handles relative to said stationary handles causes said support to be rotated from its non-supporting position to its supporting position.

11. In a rack adapted to be inserted into the well of a cooking utensil, a base member, a pair of U-shaped stationary handles mounted on said base member, each leg of said U-shaped handles having an offset portion adjacent the edge of said base member and adapted to support said rack in said well of said cooking utensil, an auxiliary support associated with said stationary handles and adapted to support said rack in an elevated position on said utensil, said support comprising transversely extending members rotatably mounted on each of said stationary handles and having offset central portions, cranks provided on each end of each of said members, and means superposed on said stationary handles and connected to said cranks for rotating said members so that said offset portion is moved from a normally vertical non-supporting position to a horizontal supporting position.

12. In a rack having a U-shaped stationary handle, a U-shaped movable handle superposed on said stationary handle, a bar mounted on said stationary handle adjacent the lower end thereof, an auxiliary support rotatably mounted on said bar and having an offset central portion adapted to normally lie in the substantially vertical plane, a crank portion provided on each end of said support and a loop provided on each leg of said U-shaped movable handle, said loop engaging said crank portions so that vertical movement of said movable handle causes rotation of said support whereby said offset portion is moved to a substantially horizontal position.

DAVID W. GUSTAVESON.